(12) United States Patent
Gao et al.

(10) Patent No.: US 8,513,342 B2
(45) Date of Patent: Aug. 20, 2013

(54) DURABLE SUPERHYDROPHOBIC COATINGS

(75) Inventors: Di Gao, Wexford, PA (US); Liangliang Cao, Atlanta, GA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 237 days.

(21) Appl. No.: 12/906,509

(22) Filed: Oct. 18, 2010

(65) Prior Publication Data

US 2011/0111656 A1  May 12, 2011

Related U.S. Application Data

(60) Provisional application No. 61/252,229, filed on Oct. 16, 2009.

(51) Int. Cl.
 *C08K 5/5415* (2006.01)
(52) U.S. Cl.
 USPC ............. 524/267; 524/401; 524/520; 526/79; 526/86
(58) Field of Classification Search
 USPC ................... 524/265, 520, 401, 267; 526/79, 526/86
 See application file for complete search history.

(56) References Cited

U.S. PATENT DOCUMENTS

| 6,068,911 A | 5/2000 | Shouji et al. |
| 6,919,398 B1 * | 7/2005 | Born et al. ................... 524/493 |
| 2006/0286305 A1 | 12/2006 | Thies et al. |
| 2009/0298369 A1 | 12/2009 | Koene et al. |
| 2009/0304996 A1 | 12/2009 | Kishikawa et al. |

FOREIGN PATENT DOCUMENTS

| JP | 08-208773 A | 8/1996 |
| JP | 2004-359857 A | 12/2004 |

OTHER PUBLICATIONS

International Search Report and Written Opinion for International Application No. PCT/US2011/001172 dated Feb. 23, 2012.

* cited by examiner

*Primary Examiner* — Ling Choi
*Assistant Examiner* — Wenwen Cai
(74) *Attorney, Agent, or Firm* — David G. Oberdick; Peter J. Borghetti

(57) ABSTRACT

Durable superhydrophobic coating composition having a composition ranging from about 10 to about 80 w.t. % of an acrylic polymer resin, from about 5 to about 40 w.t. % of a polysiloxane oil, from about 1 to about 50 w.t. % of hydrophobic particles, from about 0.1 to about 10 w.t. % metal oxides, and the remainder being one or more solvents and optionally other additives. Methods of making the coating, as well as coated substrates, are also provided.

5 Claims, 1 Drawing Sheet

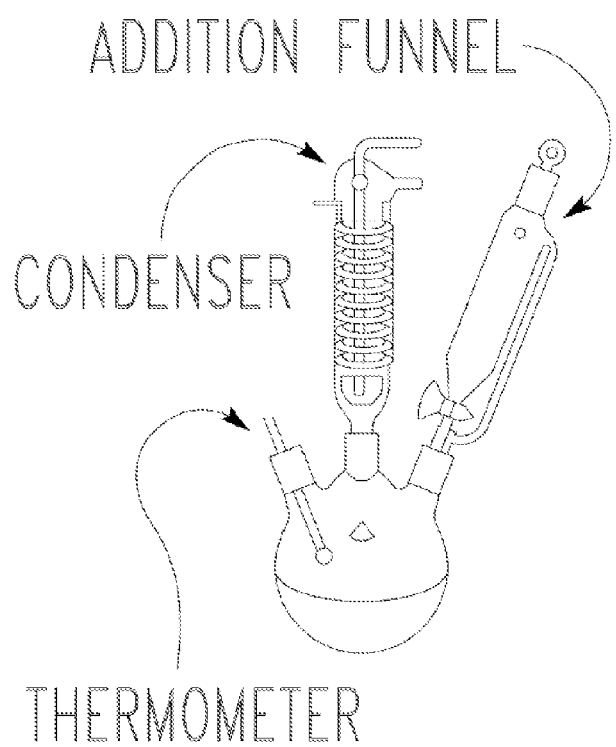

DURABLE SUPERHYDROPHOBIC COATINGS

CROSS-REFERENCE TO RELATED APPLICATIONS

This non-provisional application claims priority from U.S. Provisional Patent Application No. 61/252,229, titled DURABLE SUPERHYDROPHOBIC COATING, filed Oct. 16, 2009, which is incorporated herein by reference.

FIELD OF THE INVENTION

This invention relates to superhydrophobic coatings, and methods of making the same.

BACKGROUND INFORMATION

Most superhydrophobic coatings made by currently available technologies are not durable: they don't have a good adhesion to the substrate, so they are easily scratched off; they deteriorate over time; they do not resist heating or corrosive chemicals; they lose superhydrophobicity once completely immersed in water for a long period of time. What is needed is a coating which readily cures at room temperature and overcomes the problems of prior art coatings.

SUMMARY OF THE INVENTION

The present invention provides a synthesis method and the composition of a superhydrophobic coating which readily cures at room temperature, has good adhesion to the substrate, and forms a durable superhydrophobic surface. The coating can be applied on a variety of substrates (including metals, glass, ceramics, textiles, and paper) by conventional painting techniques including spraying, roller coating, dip coating, flow coating, and brushing. The finished surface has excellent superhydrophobicity: the water contact angle is greater than about 150°, and the sliding angle of a 4 μl droplet is less than 10°. After curing at room temperature, the coating has good thermal stability (the superhydrophobicity remains up to 200° C.), and is resistant to common corrosive chemicals including strong acids and bases. The coatings can be used as water-proof layers, self-cleaning surfaces, anti-icing coatings, and/or for hydrodynamic drag reduction.

BRIEF DESCRIPTION OF THE DRAWING

FIGURE is an illustration of a polymerization vessel (a three-necked bottle) equipped with thermometer, condenser, addition funnel and a stirrer.

DETAILED DESCRIPTION OF PREFERRED EMBODIMENTS

As used herein in the specification and claims, including as used in the examples and unless otherwise expressly specified, all numbers may be read as if prefaced by the word "about", even if the term does not expressly appear. Also, any numerical range recited herein is intended to include all subranges subsumed therein, and such ranges are understood to include each and every number and/or fraction between the stated range lower and upper values. A range of about 10 to about 80 w.t. % of an acrylic polymer resin, for example, would expressly include all intermediate values of about 10.1, 10.12, 10.2, 10.24, 10.5, all the way up to and including 79.6, 79.7, 79.9, 79.9 and 80.0 wt % of an acrylic polymer resin. The same applies to all other elemental and composition ranges set forth below.

The coating compositions of the present invention include about 10 to about 80 w.t. % of an acrylic polymer resin, about 5 to about 40 w.t. % of a polysiloxane oil, about 1 to about 50 w.t. % of hydrophobic particles (such as polytetrafluoroethylene particles, polyvinylidenefluoride particles, and particles that have been functionalized with a hydrophobic molecule at the surface) with the diameter ranging from about 50 nm to about 20 μm, from about 0.1 to about 10 w.t. % metal oxides (such as titanium oxide and iron oxide powders), and the remainder being solvents (such as toluene, acetone, methanol, propanol, and their mixtures), and other additives. The acrylic polymer resin crosslinks with the polysiloxane and acts as a binder for the coating system. The metal oxides act as a catalyst to accelerate the curing process, which makes the coating readily cure at ambient room temperature. The polysiloxane oil also acts as a mediator between the hydrophobic particles and the acrylic polymer resin, so that during the solvent evaporation process the top surface of the coating will mainly consist of the hydrophobic particles to minimize the surface free energy of the system. Upon curing of the binder, the hydrophobic particles are fixed to the surface of the coating composition which induce the superhydrophobicity of a finished top surface of the coating system.

Alternative embodiments of the present invention can include an acrylic polymer resin in the ranges of about 20 to about 25 wt. %, about 15 to about 40 wt. %, or about 10 to about 50 wt. %.

Alternative embodiments of the present invention can include polysiloxane oil in the ranges of about 10 to about 15 wt. %, about 8 to about 20 wt. %, or about 5 to about 25 wt. %.

Alternative embodiments of the present invention can include hydrophobic particles in the ranges of about 25 to about 35 wt. %, about 15 to about 50 wt. %, or about 2 to about 60 wt. %.

Alternative embodiments of the present invention can include hydrophobic particles diameters in the ranges of about 50 nm to about 200 nm, about 20 nm to about 2 μm, or about 5 nm to about 20 μm.

Alternative embodiments of the present invention can include metal oxides in the ranges of about 3 to about 6 wt. %, about 1 to about 8 wt. %, or about 0.5 to about 8 wt. %.

The acrylic polymer resin is synthesized by a free radical polymerization using a mixture of styrene and several types of acrylates (such as butyl acrylate, butyl methacrylate, and glycidyl methacrylate) as monomers. In a typical process, the monomers are first mixed in toluene and acetone. An initiator [such as 2,2'-Azobis(2-methylpropionitrile)] dissolved in toluene and acetone is added to the mixture under controlled temperature, time, and concentration conditions. At the end of the polymerization, the mixture is cooled to room temperature, and hexane is added to remove the unreacted monomers and initiators. The resin mixture precipitates out of hexane and is dried in vacuum upon heating to about 40° C.

The coatings of the present invention readily cure at room temperature, have good adhesion to a substrate, and form a durable superhydrophobic surface. The coatings can be applied on a variety of substrates (including metals, glass, ceramics, textiles, and paper) by conventional painting techniques including spraying, roller coating, dip coating, flow coating, and brushing. The finished surface has excellent superhydrophobicity: the water contact angle is greater than about 150 degree, and the sliding angle of a 4 microliter droplet is less than about 10 degree. After curing at room temperature, the coating has good thermal stability (the superhydrophobicity remains up to 200 degree C.), and is resistant to common corrosive chemicals including strong acids and bases. The coated surface can be immersed in water for more than 3 days without losing its superhydrophobicity.

EXAMPLES

The following examples are intended to illustrate the invention and should not be construed as limiting the invention in any way.

Materials:

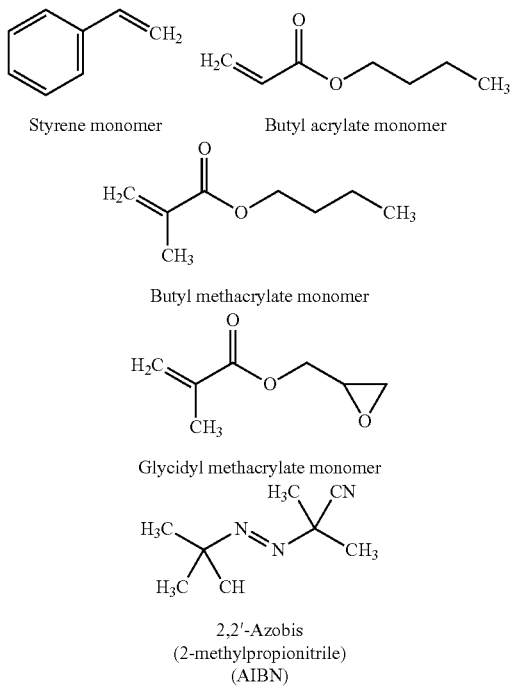

Styrene monomer

Butyl acrylate monomer

Butyl methacrylate monomer

Glycidyl methacrylate monomer 2,2'-Azobis
(2-methylpropionitrile)
(AIBN)

Acrylic Polymer Resin

The acrylic polymer was prepared by charging the following constituents into a polymerization vessel (a three-necked bottle) equipped with thermometer, condenser, addition funnel and a stirrer as shown in the FIGURE.

A mixture comprising about 3.5 g butyl acrylate, about 19.5 g butyl methacrylate, about 7.1 g glycidyl methacrylate, about 16.8 g toluene, about 5.2 g acetone, and about 5.3 g styrene was charged into the polymerization vessel, which was mounted into an oil bath and heated at about 85° C. Then, a mixture comprising about 0.4 g AIBN, about 2.2 g toluene, and about 2.2 g acetone was added, and the resulting reaction mixture was held at about 85° C. for about 90 minutes. After that, a mixture comprising about 0.2 g AIBN, about 0.9 g toluene, and about 0.9 g acetone was added, and the reaction mixture was held at about 85° C. for about 60 minutes. Finally, a mixture comprising about 0.2 g AIBN, about 0.9 g toluene, and about 0.9 g acetone was added, and the reaction mixture was held at about 85° C. for an additional about 60 minutes. At the end of the reaction period, reaction mixture cooled at room temperature (about 10 to about 30° C.), and resins were precipitated in hexane and filtered. Then the resins were dried under vacuum at about 40° C. for about 24 hours.

Superhydrophobic Coating

The superhydrophobic coating was prepared by mixing together the following constituents: about 3.8 g synthesized acrylic polymer, about 2.0 g polysiloxane oil (DOW CORNING® 840), about 4.8 g polytetrafluoroethylene particles, about 0.8 g titanium oxide powder (Degussa P25), about 0.4 g methanol, about 0.4 n-propanol, about 6.1 g toluene, and about 1.1 g acetone.

Application of Superhydrophobic Coating on Substrates

The superhydrophobic coatings can be applied on a variety of substrates (including metals, glass, ceramics, textiles, and paper) by conventional painting techniques including spraying, roller coating, dip coating, flow coating, and brushing. The thickness of the coating varies from about 0.1 mil to about 100 mil, depending on the painting techniques. The coating cures at room temperature within about 2 hours.

The water contact angles on the coating were measured by using a VCA-OPTIMA drop shape analysis system (AST Products, Inc.) with a computer-controlled liquid dispensing system and a motorized tilting stage. Water droplets with a volume of 4 μl were used to measure the static water contact angle. The advancing and receding angles were recorded during expansion and contraction of the droplets induced by placing a needle in the water droplets and continuously supplying and withdrawing water through the needle. The sliding angle was measured by tilting the stage and recorded when the droplet began to move in the downhill direction. Each measurement was repeated 3 times. The measurement was performed under normal laboratory ambient conditions (about 20° C. and about 30% relative humidity).

The cured coating has excellent superhydrophobicity: the water contact angle is greater than about 150 degree, and the sliding angle of a 4 microliter droplet is less than about 10 degree. After curing at room temperature, the superhydrophobicity of the coating remains up to about 200 degree C. The coating is also resistant to common corrosive chemicals including strong acids and bases. The coated surface can be immersed in water for more than about 3 days without losing its superhydrophobicity.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

What is claimed is:

1. A method of making a superhydrophobic coating, the method comprising the steps of:
    charging a mixture of butyl acrylate, butyl methacrylate, glycidyl methacrylate, toluene, acetone, and styrene into a polymerization vessel, which was mounted into an oil bath and heated at about 85° C.; preparing a resin from the mixture by free radical polymerization; and
    mixing the resin with a polysiloxane oil, hydrophobic particles, metal oxide particles, and suitable solvents, to create the superhydrophobic coating.

2. The method according to claim 1, wherein the step of preparing the resin further comprises adding a second mixture of AIBN, toluene, and acetone to form a reaction mixture, and holding the reaction mixture at about 85° C. for about 90 minutes.

3. The method according to claim 2, wherein the step of preparing the resin further comprises adding a third mixture of AIBN, toluene, and acetone to form a second reaction mixture, and holding the second reaction mixture at about 85° C. for about 60 minutes.

4. The method according to claim 3, wherein the step of preparing the resin further comprises adding a fourth mixture of AIBN, toluene, and acetone to form a third reaction mixture, and holding the third reaction mixture at about 85° C. for about 60 minutes.

5. The method according to claim 4, wherein the step of preparing the resin further comprises cooling the third reaction mixture at room temperature to form the resin, precipitating resin in hexane, filtering the resin, and drying the resin under vacuum at about 40° C. for about 24 hours.

* * * * *